United States Patent
Wang et al.

(10) Patent No.: US 10,824,497 B2
(45) Date of Patent: Nov. 3, 2020

(54) ENHANCED IDENTIFICATION OF COMPUTER PERFORMANCE ANOMALIES BASED ON COMPUTER PERFORMANCE LOGS

(71) Applicant: Oracle International Corporation, Redwood City, CA (US)

(72) Inventors: Fa Wang, Palo Alto, CA (US); Octavian Gheorghe Morariu, Cluj Napoca (RO); Raymond Michael Ofiaza Ordona, Hayward, CA (US); Xintao He, Beijing (CN); Mei Yuan, Foster City, CA (US); Victor Campbell Webb, Wellesley, MA (US)

(73) Assignee: Oracle International Corporation, Redwood City, CA (US)

( * ) Notice: Subject to any disclaimer, the term of this patent is extended or adjusted under 35 U.S.C. 154(b) by 81 days.

(21) Appl. No.: 16/116,149

(22) Filed: Aug. 29, 2018

(65) Prior Publication Data

US 2020/0073741 A1 Mar. 5, 2020

(51) Int. Cl.
*G06F 11/07* (2006.01)

(52) U.S. Cl.
CPC ........ *G06F 11/079* (2013.01); *G06F 11/0751* (2013.01); *G06F 11/0778* (2013.01)

(58) Field of Classification Search
CPC . G06F 11/079; G06F 11/0751; G06F 11/0778
See application file for complete search history.

(56) References Cited

U.S. PATENT DOCUMENTS

| 10,140,576 | B2* | 11/2018 | Eldardiry | G06F 21/00 |
| 2011/0296244 | A1* | 12/2011 | Fu | G06F 11/3608 |
| | | | | 714/37 |
| 2016/0335260 | A1* | 11/2016 | Convertino | G06F 16/24578 |
| 2019/0095313 | A1* | 3/2019 | Xu | G06N 3/049 |

OTHER PUBLICATIONS

Y. Liang, Y. Zhang and H. Xiong, "Failure Prediction in IBM BlueGene/L Event Logs," IEEE International Conference on Data Mining, 2007, 6 pages.

P. Bodik, M. Goldszmidt and A. Fox, "Fingerprinting the Datacenter: Automated Classification of Performance Crises," Proceedings of the 5th European conference on Computer systems, pp. 111-124, 2010.

(Continued)

*Primary Examiner* — Matthew M Kim
*Assistant Examiner* — Kurosu Risa Altaf

(57) ABSTRACT

In an exemplary embodiment, computer circuitry determines term characterization values for terms in computer performance logs and generates vectors that indicate the term characterization values. The computer circuitry determines vector similarity scores for these vectors. The computer circuitry aggregates the computer performance logs into aggregated logs based on the vector similarity scores. The computer circuitry selects rare logs from these aggregated logs and obtains computer performance anomaly labels for the rare logs. The computer circuitry matches new computer performance logs with the rare logs to detect the labeled computer performance anomalies.

18 Claims, 8 Drawing Sheets

(56) References Cited

OTHER PUBLICATIONS

Q. Lin, H. Zhang, J. Lou, Y. Zhang and X. Chen, "Log Clustering based Problem Identification for Online Service Systems," IEEE/ACM International Conference on Software Engineering Companion (ICSE-C), 2017, 10 pages.
W. Xu, L. Huang, A. Fox, D. Patterson, M. Jordan, "Detecting Large-Scale System Problems by Mining Console Logs," Proceedings of the ACM SIGOPS 22nd symposium on Operating systems principles, 2009, 15 pages.
J. Lou, Q. Fu, S. Yang, Y. Xu, J. Li, "Mining Invariants from Console Logs for System Problem Detection," Proceedings of the 2010 USENIX conference on USENIX annual technical conference, pp. 1-14, 2010.
K. Yamanishi and Y. Maruyama, "Dynamic Syslog Mining for Network Failure Monitoring," Proceedings of the eleventh ACM SIGKDD International conference on Knowledge discovery in data mining, 2005, 10 pages.
"Log Management", downloaded from https://www.splunk.com/en_us/solutions/solution-areas/log-management.html on Sep. 18, 2018, 8 pages.
James Trumbull, "The logtash Book, Log Management made easy," Sep. 28, 2017, 37 pages.
"Structuring your log data", downloaded from https://docs.logentries.com/docs/best-practices-logs on Aug. 26, 2018, 4 pages.

\* cited by examiner

ENHANCED IDENTIFICATION OF COMPUTER PERFORMANCE ANOMALIES BASED ON COMPUTER PERFORMANCE LOGS

TECHNICAL BACKGROUND

Computers host web sites, sales applications, media content, financial databases, customer records, and the like. A large cloud computing network may feature a large number of data centers around the globe that each have numerous computers. The data centers serve hospitals, schools, media networks, government agencies, web businesses, and the like. The management of these large cloud and complex computing networks is a significant challenge. Computer analysts often study computer performance logs to manage cloud computing networks. The computers that comprise the cloud generate the computer performance logs as a part of their normal operation. The computer performance logs are human-readable statements that indicate the current status of the circuitry, operating systems, databases, and applications in the cloud.

A typical computer performance log might be "HOST X23 STARTS APP 341267 2108:06:03:14:33:18." In large cloud computing networks, a massive number of computers may each produce performance logs every second or so. This raw amount of computer performance logs is a challenge to digest. In addition, the diversity of computer performance logs is also a challenge because the logs are not uniform. The syntax of computer performance logs may not only differ between individual computers but may change over time as well.

Data network operators use computer performance logs to service the end-users of the cloud computing networks. For example, a computer technician may receive an alarm that a hospital is experiencing excessive database latency. The computer technician may study the relevant computer performance logs for the computers that serve the hospital to solve the latency problem. The computer technician may then establish an automated computer response to specific computer performance logs by subsequently detecting the same log text and launching a pre-selected computer script. This manual approach to processing computer performance logs is not scalable.

Computer technicians cannot manually handle the massive amount of computer performance logs, so automated computer tools have been developed. These log analytic tools require structured log lines that are pre-associated with known anomalies, but this not proven to be an effective situation in many global computer networks. Many log analytic tools operate off-line on archived log lines to detect performance anomalies, but the off-line log analytic tools are too slow to mitigate computer performance anomalies in real-time. Current log analytic tools are not optimized to handle the massive quantity of diverse computer performance logs that are produced by today's global computer networks. Current log analytic tools are not configured to efficiently detect and mitigate these complex computer performance anomalies in real time.

TECHNICAL OVERVIEW

In an exemplary embodiment, computer circuitry determines term characterization values for terms in computer performance logs and generates vectors that indicate the term characterization values. The computer circuitry determines vector similarity scores for these vectors. The computer circuitry aggregates the computer performance logs into aggregated logs based on the vector similarity scores. The computer circuitry selects rare logs from these aggregated logs and obtains computer performance anomaly labels for the rare logs. The computer circuitry matches new computer performance logs with the rare logs to detect the labeled computer performance anomalies.

DETAILED DESCRIPTION

Figure 1:
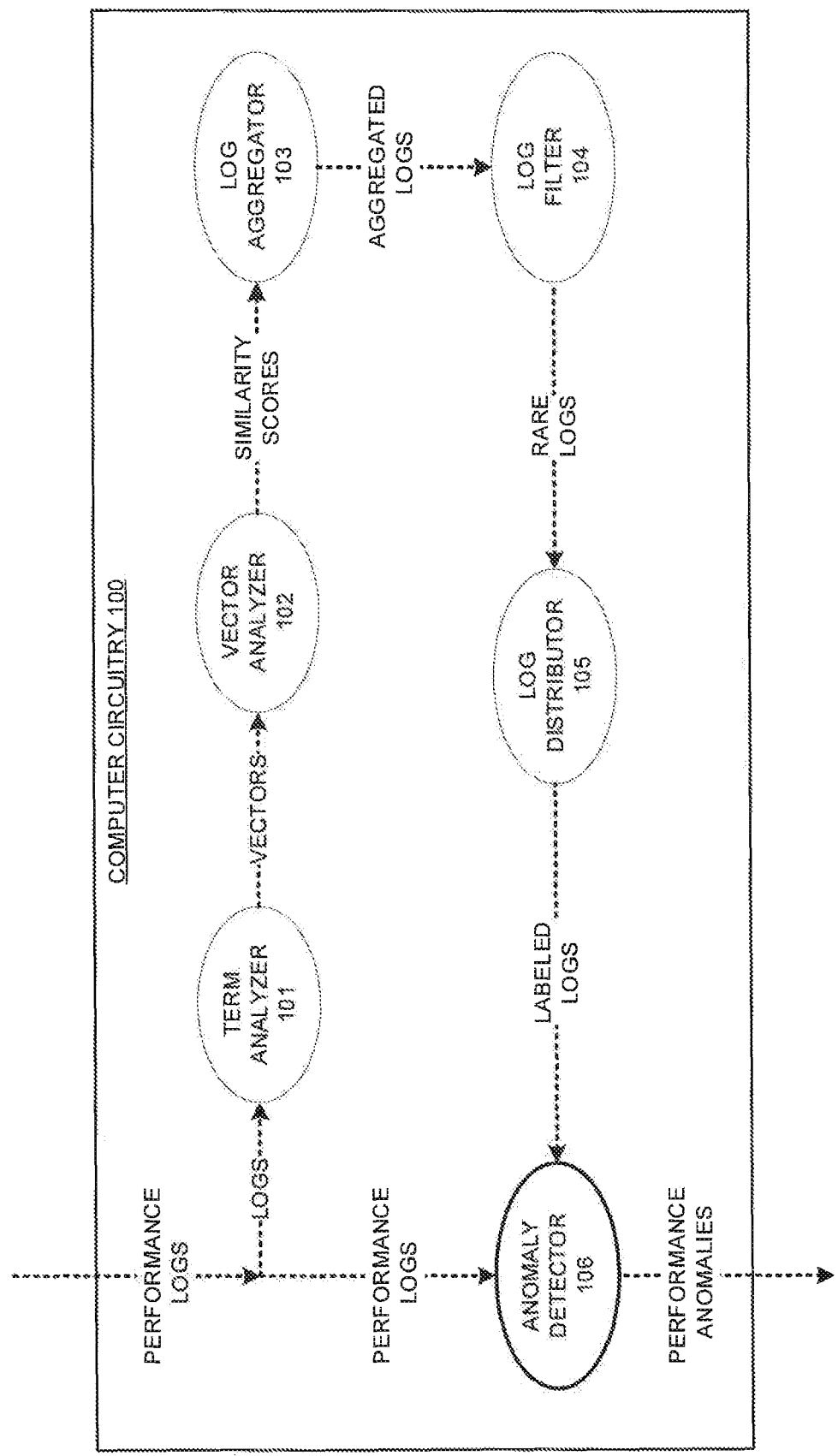
FIG. 1 illustrates computer circuitry to identify computer performance anomalies based on computer performance logs in an exemplary embodiment although the circuitry may vary in other embodiments.

FIG. 1 illustrates computer circuitry 100 to identify computer performance anomalies based on computer performance logs in an exemplary embodiment, although computer circuitry 100 may vary in other embodiments. Computer circuitry 100 typically comprises general-purpose computer hardware that has been configured with special-purpose log data processing software. Computer circuitry 100 may be distributed across several computers that are deployed across a large geographic area and interconnected by data communication links.

Computer circuitry 100 includes hardware like Central Processing Units (CPUs), controllers, Random Access Memory (RAM), persistent data storage, bus interfaces, and Input/Output (I/O) ports. Computer circuitry 100 is configured with software like operating systems, data communication modules, and data processing applications. Computer circuitry 100 comprises term analyzer 101, vector analyzer 102, log aggregator 103, log filter 104, log distributer 105, and anomaly detector 106.

The computer performance logs are automatically generated by computer circuitry 100 or some other computer circuitry and comprise text statements that characterize current status. For example, an operating system may drive its CPU to generate the following log line when the operating system executes a web server application, "2018:03:

25:14:23:12 WEB PROCESS 25Y STARTED ON HOST 26C." When a database controller detects a loss of signaling from its Content Delivery Network (CDN), the controller may generate a log line like "2018:05:12:13:22:11 DB 13R HOST 18Z CDN X5 OFF."

The computer performance anomalies comprise unhealthy computer conditions like CPU failures, memory crashes, inefficient software loops, or some other computer problem. When the specific log text for a specific computer performance anomaly is known, then detecting that specific computer performance anomaly from new log text is fairly easy. In massive computer deployments, all of the specific log text for all of the computer performance anomalies is not typically known. Some of the computer performance anomalies themselves remain unknown and new computer performance anomalies develop over time. Thus, detecting a new computer performance anomaly in a massive computer deployment is extremely difficult when the specific log text for that computer performance anomaly is still unknown. Advantageously, computer circuitry 100 can be configured to process massive amounts of unknown computer performance log text to learn and identify a multitude of different computer performance anomalies.

In operation, computer circuitry 100 receives computer performance logs from various sources like operating systems, database controllers, and user applications. Computer circuitry 100 typically pre-processes the computer performance logs to remove and replace unhelpful data. For example, an identification number that differs across log statements but has no useful meaning may be replaced with "[SRV#]." Computer circuitry 100 then forwards the pre-processed computer performance logs to term analyzer 101.

Term analyzer 101 determines term characterization values for terms in the computer performance logs. The term characterization values may indicate the importance of the term within the overall collection of log terms. For example, term analyzer 101 may perform a Term Frequency-Inverse Document Frequency (TF-IDF) analysis on individual text terms to generate numeric importance values. Term analyzer 101 then generates vectors for the computer performance logs based on the characterization values. A vector indicates a sequence of characterization values for a sequence of log terms in a log line or a block of log lines. Term analyzer 101 transfers the vectors for the log lines to vector analyzer 102.

Vector analyzer 102 determines vector similarity scores for the vectors. The vector similarity scores indicate the sameness of the corresponding the characterization values in a vector pair. For example, vector analyzer 102 may perform a cosine similarity analysis on pairs of vectors to generate numerical sameness metrics for the vector pairs. Vector analyzer 102 transfers the numerical vector similarity scores to log aggregator 103.

Log aggregator 103 aggregates the same or similar computer performance logs into aggregated performance logs based on the vector similarity scores. An aggregated performance log includes a count of the individual computer performance logs that were aggregated into the aggregated log. For example, one aggregated log may comprise an aggregation of a few computer performance logs while a second aggregated log may comprise an aggregation of a multitude of computer performance logs. In some embodiments, log aggregator 103 scrubs terms from the aggregated logs by replacing unwanted terms with general placeholders. For example, known time-of day patterns (YYYY-MM-DD) may be masked as [TOD]. In another example, nearly identical addresses (59.66.135.198 and 59.66.135.199) may be masked [PLACEHOLDER] without any known patterns. Log aggregator 103 transfers the aggregated performance logs to log filter 104.

In some embodiments that are detailed further below, numerous clients perform the above tasks in parallel (term characterization, vector similarity, and log aggregation) and transfer their aggregated performance logs to a centralized server. The server then performs another round of term characterization, vector similarity, and log aggregation to further aggregate and scrub the logs at the server level. The server then applies log filter 104.

Log filter 104 determines rare logs based on a comparison of the aggregated log's number of computer performance logs to a rarity threshold. Log filter 104 transfers the rare logs to log distributor 105. The rarity threshold is set by experts and may be as low as 1.

Log data distributor 105 presents the rare logs to a human expert for anomaly labeling. An exemplary label might be "SERVICE XYZ MEMORY CRITICAL." The expert may also add triggers to the label that are performed when the labeled log is detected. An exemplary trigger might be to send an alarm message for SERVICE XYZ to a network address and to initiate additional memory for SERVICE XYZ. Log data distributor 105 may present blocks of performance logs to the human expert for block-level anomaly labeling and triggers. Log data distributor 105 transfers the labeled performance logs with their triggers to anomaly detector 106. Log distributor 105 may be in a server that transfers labeled performance logs to numerous anomaly detectors in numerous client computers.

Anomaly detector 106 receives labeled performance logs from log distributor 105. Anomaly detector 106 receives and compares new performance logs to the labeled performance logs to detect the corresponding computer performance anomalies based on text sequence matches. For example, the new performance log "2018:05:12:23:14:23 DB CNT 23 PWR OFF 59.66.135.198 matches the labeled performance log "[TOD] DB CNT 23 PWR OFF [PLACEHOLDER]." Anomaly detector 106 detects the match between the logs based on text sequence similarity and responsively performs the triggers for the labeled performance anomaly.

In a simplified block example, a labeled block of performance logs may comprise: "[TOD] CPU 123 OVERHEAT" and "[TOD] SRV 123 PWR FAIL [HOST]" when they occur in sequence and within one minute of each other. The following new log lines would match, "2018:05:12:23:14:23 CPU 123 OVERHEAT" and "2018:05:12:23:15:07 SRV 123 PWR FAIL HOST 23" which are separated by 44 seconds. Anomaly detector 106 detects the matches and time correlation between these log blocks and responsively performs the triggers for the labeled performance anomaly.

Computer circuitry 100 comprises computer hardware and software that is configured together to improve the end-user computing experience by processing large amounts of new computer performance logs to learn and identify computer performance anomalies. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like Control Units (CUs), Logic Units (LUs), and Random Access Memory (RAM). In turn, the CUs, LUs, and RAM are metallically connected to form CPUs, DSPs, GPUs, transceivers, bus circuitry, and memory.

In the computer hardware, the CUs drive data between the RAM and the LUs, and the LUs operate on the data. The CUs also drive interactions with external memory like flash drives, disk drives, and the like. The computer hardware executes machine-level software to control and move data by driving machine-level inputs like voltages and currents to the CUs, LUs, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control.

Figure 2:
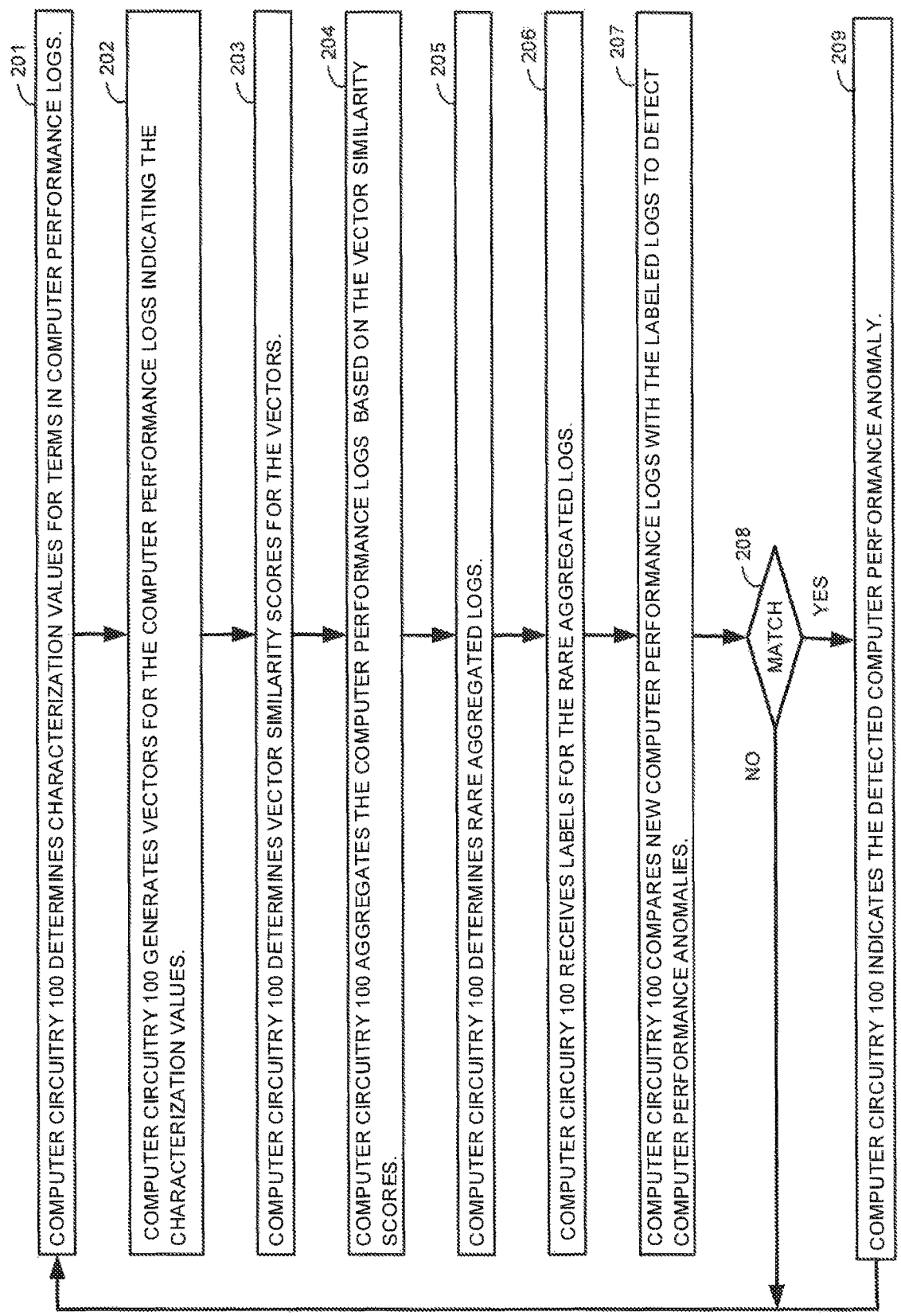
FIG. 2 illustrates the operation of the computer circuitry to identify computer performance anomalies based on computer performance logs in an exemplary embodiment although the operation may vary in other embodiments.

FIG. 2 illustrates the operation of computer circuitry 100 to identify computer performance anomalies based on computer performance logs in an exemplary embodiment although the operation may vary in other embodiments. Computer circuitry 100 determines term characterization values for the terms in the computer performance logs (201). The term characterization values may indicate the importance of the term within the overall collection of log terms, such as TF-IDF values. Computer circuitry 100 generates vectors for the computer performance logs based on the term characterization values (202). A vector indicates a sequence of characterization values for a corresponding sequence of terms in a log line. Computer circuitry 100 determines vector similarity scores for the vectors (203). A vector similarity score indicates the overall sameness of corresponding characterization values in a vector pair. Computer circuitry 100 may perform a cosine similarity analysis on vector pairs to generate the numerical sameness metrics.

Computer circuitry 100 aggregates the same or similar computer performance logs into aggregated performance logs based on the vector similarity scores (204). For example, groups of computer performance logs that are at least 95% the same could be aggregated together. Computer circuitry 100 determines rare aggregated logs by comparing their aggregation amounts to a rarity threshold (205). Computer circuitry 100 then receives labels with triggers from an expert labeler for the rare logs (206). Computer circuitry 100 attempts to match term sequences from new computer performance logs with term sequences from the labeled logs to detect the associated computer performance anomalies (207). If a term sequence match is detected (208), computer circuitry 100 indicates the detected computer performance anomaly and performs any other triggers (209). The operation repeats (201).

Figure 3:
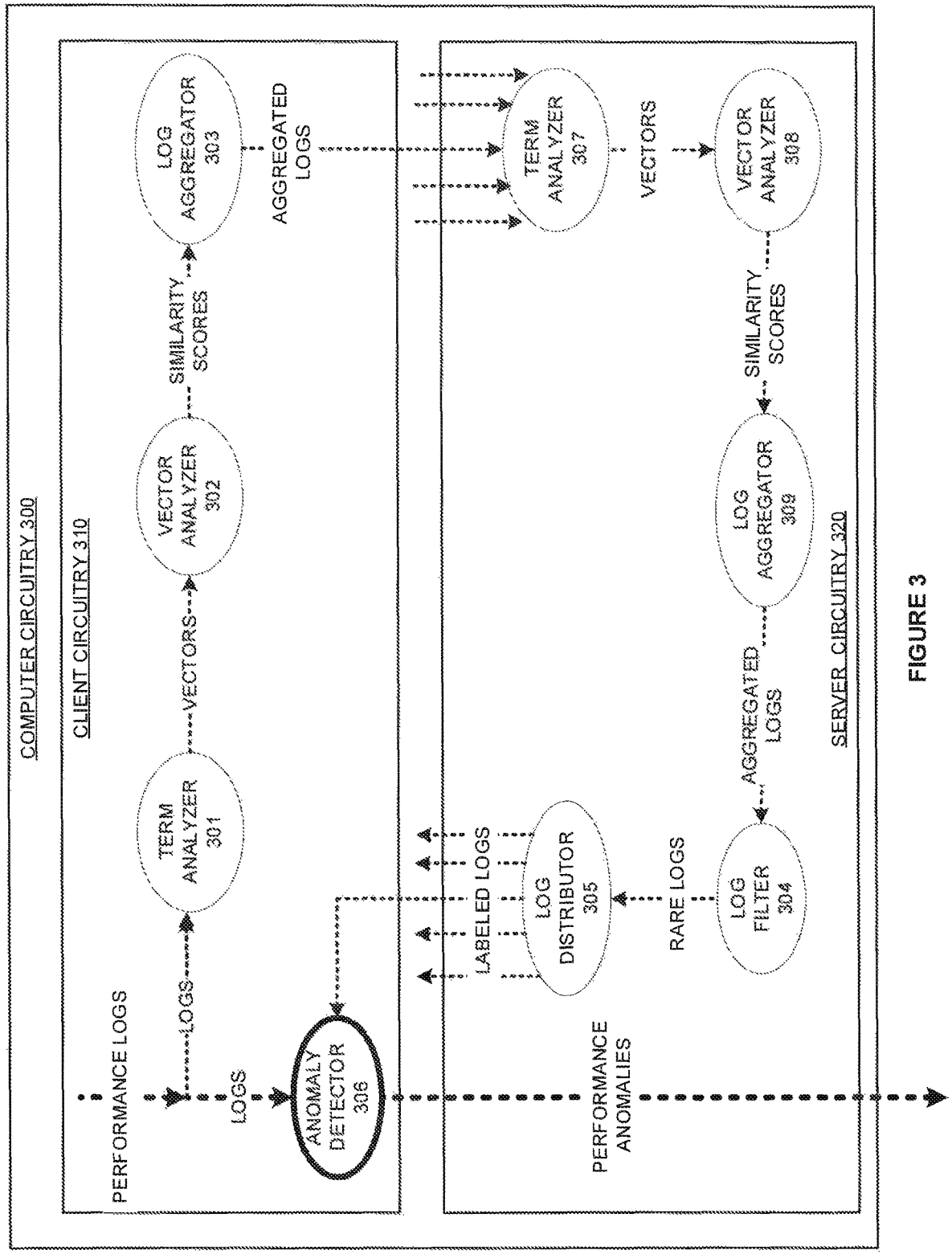
FIG. 3 illustrates computer circuitry having client circuitry and server circuitry to identify computer performance anomalies based on computer performance logs in an exemplary embodiment although the circuitry may vary in other embodiments.

FIG. 3 illustrates computer circuitry 300 having client circuitry 310 and server circuitry 320 to identify computer performance anomalies based on computer performance logs in an exemplary embodiment although the circuitry may vary in other embodiments. Client circuitry 310 comprises term analyzer 301, vector analyzer 302, log aggregator 303, and anomaly detector 306. Server circuitry 320 comprises log filter 304, log distributor 305, term analyzer 307, vector analyzer 308, and log aggregator 309. These elements comprise CPUs, controllers, RAM, persistent data storage, bus interfaces, I/O ports, operating systems, data communication modules, log data applications, and user applications. Advantageously, computer circuitry 300 is configured to process massive amounts of unknown computer performance logs to learn and identify a multitude of different computer performance anomalies.

Client circuitry 310 receives computer performance logs from various sources like operating systems, database controllers, and user applications that also execute in client circuitry 310. Client circuitry 310 pre-processes the computer performance logs to remove or mask unwanted data. For example, pre-processing may trim away characters from the beginning and end of each log line. Pre-processing may remove unnecessary white space. Pre-processing may replace date, time, and like values with abstractions or placeholders. Client circuitry 310 forwards the pre-processed computer performance logs to term analyzer 301.

Term analyzer 301 determines term characterization values for terms in the computer performance logs. The term characterization values numerically indicate the importance of the term within the overall collection of log terms like numeric Term Frequency (TF)-Inverse Document Frequency (IDF) values. A TF-IDF value equals the product of TF and IDF. The TF could be a raw count of a term in all log lines or a scaled version of that count. The IDF is a logarithm of a number that equals the total number of log lines divided by the number of log lines having the term. Term analyzer 301 generates vectors of the characterization values that correspond to the sequence of log terms in the log line. Term analyzer 301 transfers the vectors for the log lines to vector analyzer 302.

Vector analyzer 302 scores vector similarity for the vectors. Vector analyzer 302 may perform a cosine similarity analysis on vector pairs to generate numerical sameness metrics. Cosine similarity produces a vector similarity value that equals the dot product of the two vectors divided by the product of the vector magnitudes. Vector analyzer 302 transfers the numerical vector similarity scores for the vector pairs to log aggregator 303.

Log aggregator 303 aggregates the same or similar computer performance logs into aggregated performance logs based on the vector similarity scores. For example, if two logs have a vector similarity score above 80% sameness, then the two logs may be aggregated together—and the aggregation count for the aggregated log is increased by one. Log aggregator 303 also scrubs terms from the aggregated logs by replacing select terms with general placeholders. Exemplary terms for scrubbing include network addresses, hostnames, and thread identifiers.

When two log lines match per the vector similarity scores, log aggregator 303 compares the log lines term-by-term for term matches. Log aggregator scrubs 303 replaces non-matching terms in the new log line with placeholders. If the number of placeholders divided by the number of terms in the new line exceeds a threshold, then the new line may not be aggregated after all because too many placeholders are required for a good match. If multiple labeled log lines match a new log line, then the new log line is aggregated with the labeled log line that has the most matching terms and/or the fewest placeholders. Log aggregator 303 transfers the aggregated and scrubbed performance logs from client circuitry 310 to term analyzer 307 in server circuitry 320.

In server circuitry 320, term analyzer 307 receives aggregated performance logs from log aggregator 303 in client circuitry 310. Term analyzer 307 also receives additional aggregated logs from other log aggregators in another client circuitry. Term analyzer 307 determines term characterization values for terms in the aggregated logs. The term characterization values may comprise numeric TF-IDF values. Term analyzer 307 generates vectors of these characterization values that correspond to the sequence of aggregated log terms in the aggregated log line. Term analyzer 307 transfers the vectors for the aggregated log lines to vector analyzer 308.

Vector analyzer 308 determines vector similarity for the vectors, such as cosine similarity on vector pairs. Vector analyzer 308 transfers the numerical vector similarity scores to log aggregator 309. Log aggregator 309 further aggregates same or similar aggregated logs into based on the vector similarity scores. Log aggregator 309 scrubs terms from these aggregated logs and adds general placeholders. Log aggregator 309 transfers the aggregated and scrubbed performance logs log filter 304.

Log filter 304 determines rare logs based on a comparison of the aggregated log's number of computer performance logs to a rarity threshold. Log filter 304 transfers the rare aggregated logs to log distributor 305. Log data distributor 305 presents the rare aggregated logs to a human expert for anomaly labeling. Log data distributor 305 may expand the presentation to display blocks of performance logs for block-level anomaly labeling. Log data distributor 305 may also automatically expand in time from a given rare log line to identify time-based correlations with other rare log lines and present these block-level correlations for labeling. Log data distributor 305 transfers the labeled performance logs with triggers from server circuitry 320 to anomaly detector 306 in client circuitry 310. Log data distributor 305 also transfers labeled performance logs with triggers to anomaly detectors in other client circuitries.

In client circuitry 310, anomaly detector 306 receives labeled performance logs from log distributor 305 in server circuitry 320. Anomaly detector 306 receives new performance logs and compares the new logs to the labeled logs to detect corresponding computer performance anomalies based on text sequence matches. Anomaly detector 306 also compares new log blocks to labeled log blocks to detect computer performance anomalies at the block level. Anomaly detector 306 responsively performs any triggers associated with the detected computer performance anomalies. In the other client circuitries, the other anomaly detectors also compare new logs to labeled logs to detect computer performance anomalies and perform triggers.

Advantageously, client circuitry 300 processes massive amounts of unknown log text in distributed client circuitry 310 to aggregate new logs and to identify performance anomalies. Server circuitry 320 further aggregates the logs and develops the labeled logs that are used by the client circuitry to identify performance anomalies. This specific distribution of tasks between client/server is optimal in many global computer networks.

Figure 4:
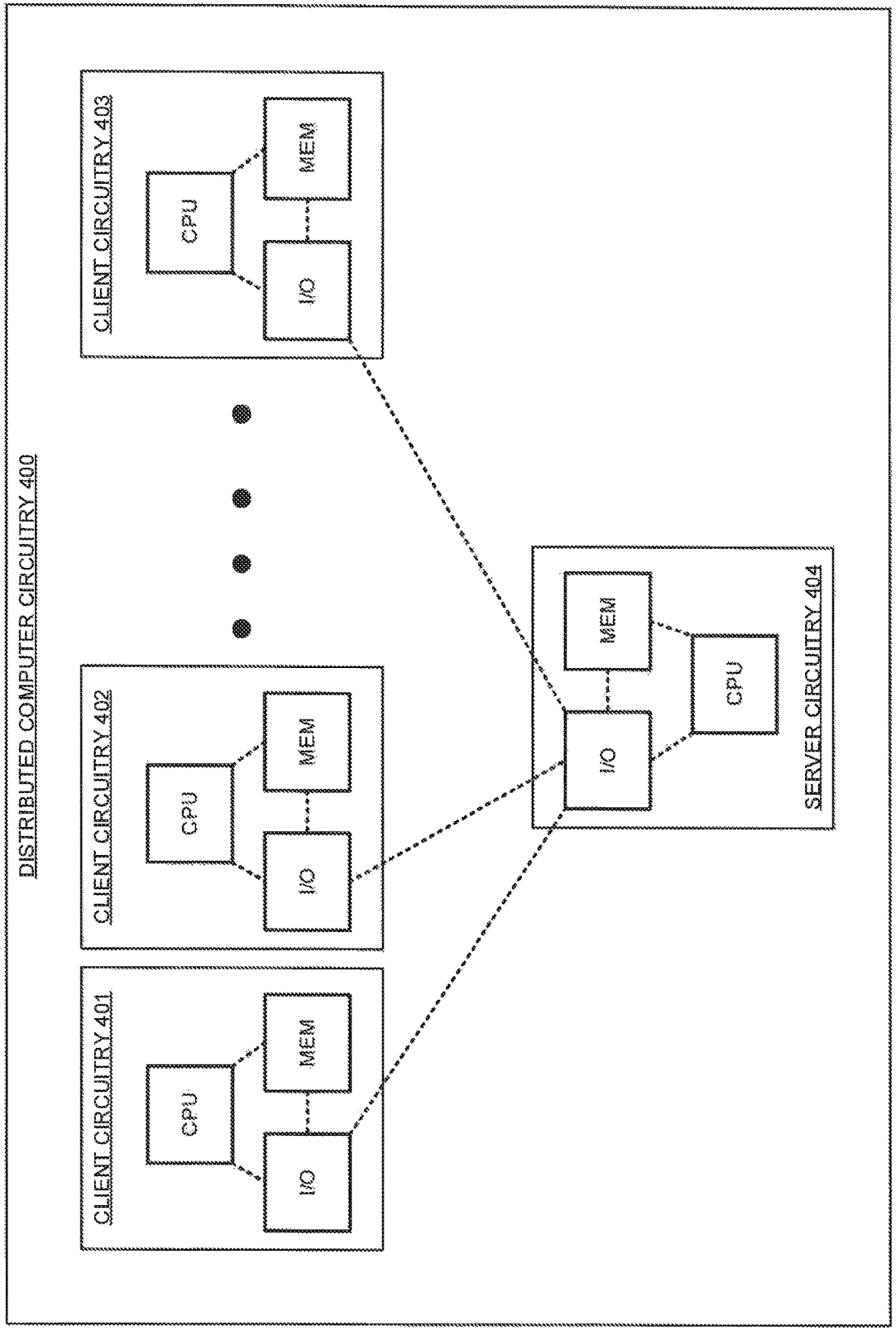
FIG. 4 illustrates distributed client and server circuitry to identify computer performance anomalies based on computer performance logs in an exemplary embodiment although the circuitry may vary in other embodiments.

FIG. 4 illustrates distributed computer circuitry 400 to identify computer performance anomalies based on computer performance logs in an exemplary embodiment although the circuitry may vary in other embodiments. Distributed computer circuitry 400 comprises client circuitry 401-403 and server circuitry 404. Client circuitry 401-403 comprises CPU circuitry, I/O circuitry, and memory (MEM) circuitry. The memory circuitry stores software like operating systems, communication modules, user applications, user databases, and log data applications. Server circuitry 404 also comprises CPU circuitry, I/O circuitry, and memory circuitry, and the memory circuitry stores software like operating systems, communication modules, application controllers, database controllers, and log data applications. Client circuitry 401-403 is depicted in a simplified manner and represents numerous additional client computers. Moreover, server circuitry 404 could be horizontally expanded with more servers or vertically expanded with more server tiers—although operating in essentially the same way.

Client circuitry 401-403 generates computer performance logs from their CPUs, I/O, memories, operating systems, controllers, and applications. Client circuitry 401-403 pre-processes the computer performance logs to trim and mask unwanted characters from each log line. Client circuitry 401-403 also replaces known data with abstracted placeholders. Client circuitry 401-403 determines numeric TF-IDF values for the terms in the computer performance logs. Client circuitry 401-403 generates vectors of the TF-IDF values that correspond to the term sequence in the log lines. Client circuitry 401-403 determines cosine similarity metrics for the vectors. Client circuitry 401-403 aggregates like ones of the computer performance logs into aggregated performance logs based on the vector similarity scores. Client circuitry 401-403 scrubs terms from the aggregated logs by replacing select terms with abstract placeholders. Client circuitry 401-403 transfers the aggregated and scrubbed performance logs to server circuitry 404.

Server circuitry 404 receives the scrubbed and aggregated performance logs from client circuitry 401-403 (and numerous other clients). Server circuitry 404 determines TF-IDF values for the terms in the aggregated performance logs from the clients. Server circuitry 404 generates vectors of the TF-IDF values and determines cosine similarity for the vector pairs. Server circuitry 404 aggregates like ones of the aggregated performance logs into additional aggregated performance logs based on the vector similarity scores. Server circuitry 404 also scrubs these aggregated logs.

Server circuitry 404 determines rare logs based on their number of component logs and a rare log threshold. Server circuitry 404 presents the rarest of the aggregated logs to a human expert for labeling and receives performance anomaly labels and triggers to process upon anomaly detection. Server circuitry 404 also associates rare performance logs in the time domain for expert labeling of time-blocks of logs. Server circuitry 404 transfers the labeled logs to client circuitry 401-403 and to numerous other clients.

Client circuitry 401-403 receives the labeled logs from server circuitry 404. Client circuitry 401-403 generates new performance logs and compares the new performance logs to its stored labeled logs to detect computer performance anomalies. Client circuitry 401-403 also performs triggers for any detected computer performance anomalies. The other clients also process new logs against labeled logs to detect computer performance anomalies and perform triggers. Advantageously, distributed computer circuitry 400 can process a massive amount of unknown log text to learn and respond to computer performance anomalies.

Figure 5:
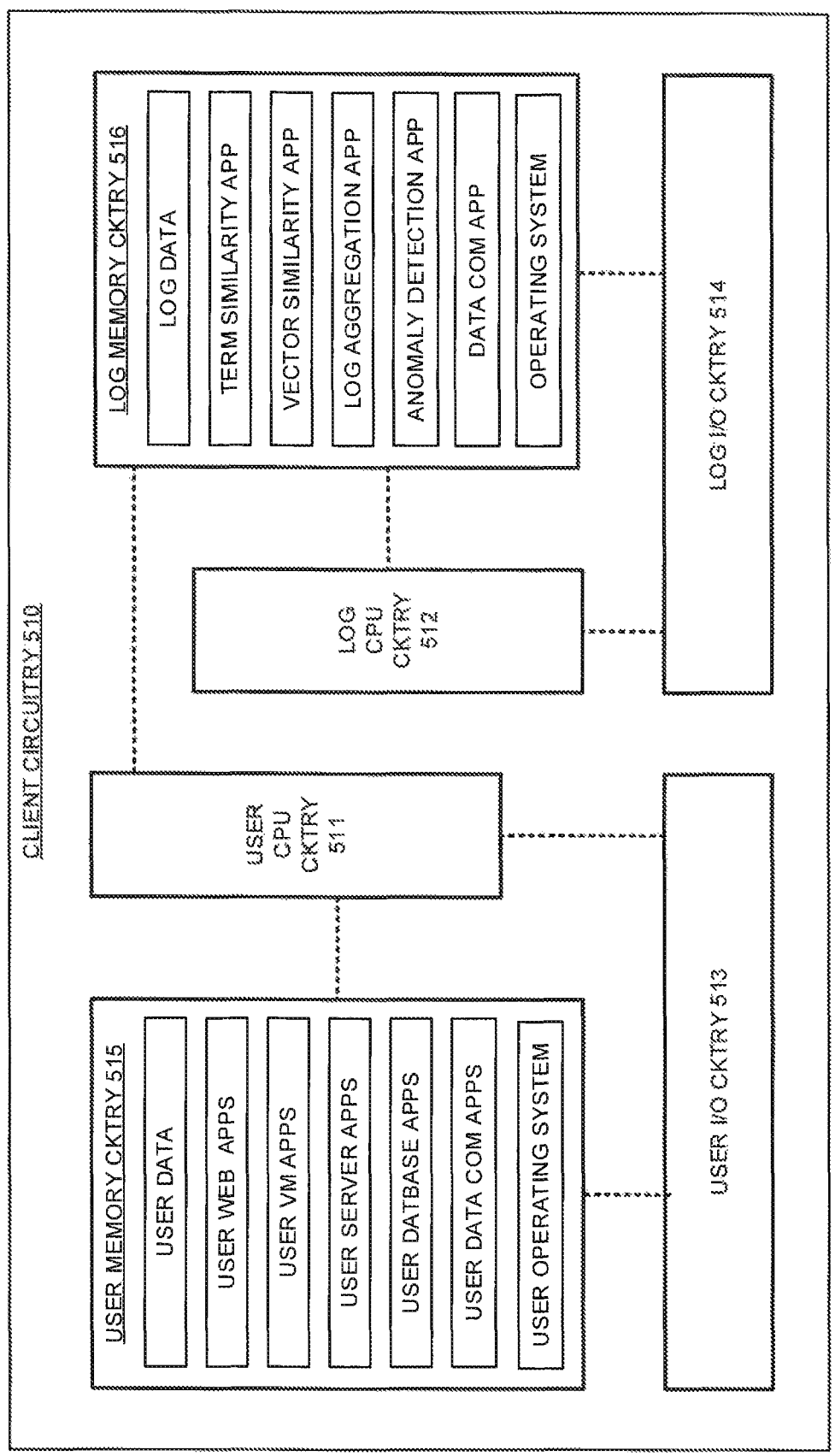
FIG. 5 illustrates client circuitry to identify computer performance anomalies based on computer performance logs in an exemplary embodiment although the circuitry may vary in other embodiments.

FIG. 5 illustrates client circuitry 510 to identify computer performance anomalies based on computer performance logs in an exemplary embodiment although the circuitry may vary in other embodiments. Client circuitry 510 comprises user I/O circuitry (CKTRY) 513, user memory circuitry 515, user CPU circuitry 511, log I/O circuitry 514, log memory circuitry 516, and log CPU circuitry 512. I/O circuitry 513-514 comprises communication equipment, such as ports, bus interfaces, signal processors, memory, software, and the like. CPU circuitry 511-512 comprises circuit boards, integrated micro-processors, cache memory, RAM, and associated electronics. Memory circuitry 515-516 comprises non-transitory, machine-readable, data storage media, such as flash drives, disc drives, and the like. All or portions of the software components may be externally stored on one or more storage media, such as circuitry, discs, flash memory, and the like. Some conventional aspects of client circuitry 510 are omitted for clarity, such as power supplies and enclosures. In some embodiments, log CPU circuitry 512, log memory circuitry 516, and/or log I/O circuitry 514 may be omitted, and corresponding user CPU circuitry 511, user memory circuitry 515, and/or user I/O circuitry 513 may be used on a time-shared basis.

User memory circuitry 515 stores a user operating system, user data communication applications (APPS), user database applications, user server applications, user Virtual Machine (VM) applications, user web applications, and user data. User CPU circuitry 511 retrieves and executes the user operating system, user data communication applications, user database applications, user server applications, user virtual machine applications, and user web applications to manipulate and exchange the user data. Log memory circuitry 516 stores an operating system, data communication application, anomaly detection application, log aggregation application, vector similarity application, term similarity application, and log data. Log CPU circuitry 512 retrieves and executes the operating system, data communication application, anomaly detection application, log aggregation application, vector similarity application, and term similarity application to process the log data to detect computer performance anomalies.

In particular, the user operating system and the user applications direct user CPU circuitry 511 to generate and transfer new computer performance logs to log memory circuitry 516. The anomaly detection application directs log CPU circuitry 512 to compare the new computer performance logs to labeled performance logs on a sequential term-by-term basis to detect line matches. The anomaly detection application also directs CPU circuitry 512 to detect time-blocks of the line matches that correspond to block-level computer performance anomalies. The term similarity application directs CPU circuitry 512 to generate TF-IDF vectors for new computer performance log lines. The vector similarity application directs CPU circuitry 512 to generate cosine similarity scores for pairs of the TDF-IF vectors. The log aggregation application aggregates similar computer performance logs based on their cosine similarity scores. The data communication application transfers detected performance anomaly indicators and aggregated performance logs to a log server. The data communication application receives the labeled performance logs from the log server. Advantageously, client circuitry 510 aggregates and compares computer performance logs in a distributed architecture that efficiently handles the massive amount of log lines and line comparisons.

Figure 6:
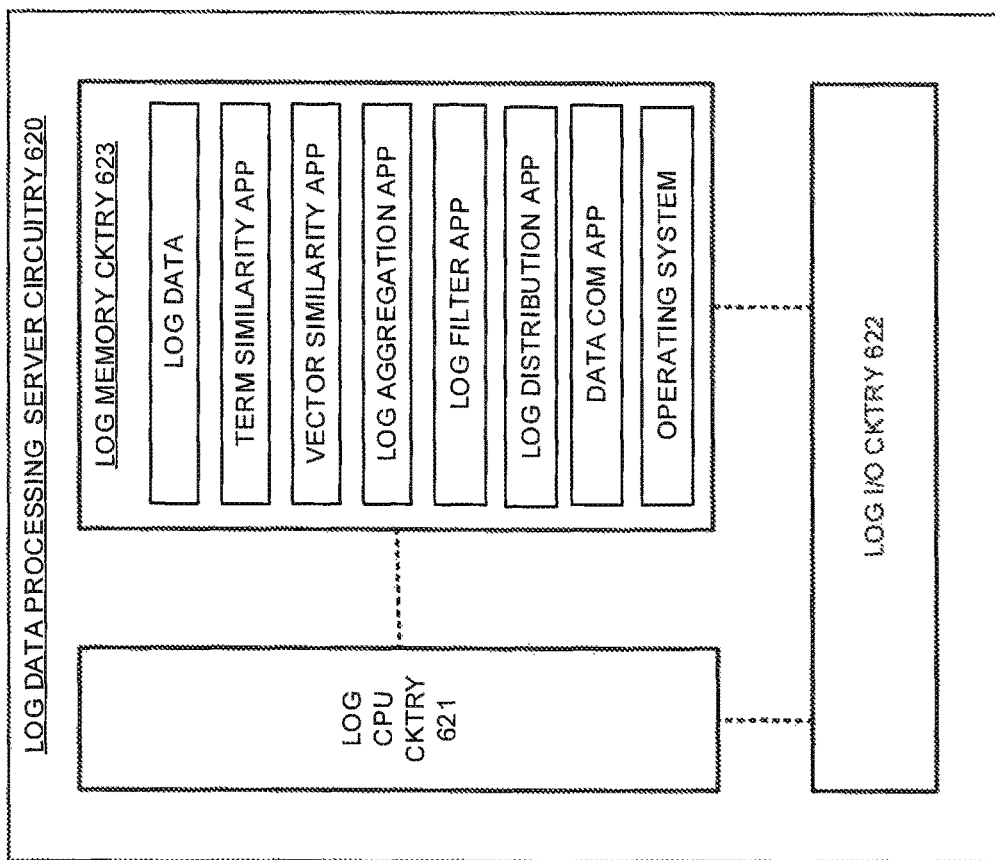
FIG. 6 illustrates log server circuitry to support the identification of computer performance anomalies based on computer performance logs in an exemplary embodiment although the circuitry may vary in other embodiments.

FIG. 6 illustrates log data processing server circuitry 620 to support the identification of computer performance anomalies based on computer performance logs in an exemplary embodiment although the circuitry may vary in other embodiments. Server circuitry 620 comprises log I/O circuitry 622, log memory circuitry 623, and log CPU circuitry 621. Log I/O circuitry 622 comprises communication equipment, such as ports, bus interfaces, signal processors, memory, software, and the like. Log CPU circuitry 621 comprises circuit boards, integrated micro-processors, cache memory, RAM and associated electronics. Log memory circuitry 623 comprises non-transitory, machine-readable, data storage media, such as flash drives, disc drives, and the like. All or portions of the software components may be externally stored on one or more storage media, such as circuitry, discs, flash memory, and the like. Some conventional aspects of server circuitry 620 are omitted for clarity, such as power supplies and enclosures.

Log memory circuitry 623 stores an operating system, data communication application, log distribution application, log filter application, log aggregation application, vector similarity application, term similarity application, and log data. Log CPU circuitry 621 retrieves and executes the operating system, data communication application, log distribution application, log filter application, log aggregation application, vector similarity application, term similarity application to aggregate, label, and distribute log data.

In particular, the term similarity application directs log CPU circuitry 621 to generate TF-IDF vectors for the aggregated log lines from the clients. The vector similarity application directs log CPU circuitry 621 to generate cosine similarity scores for pairs of the TF-IDF vectors. The log aggregation application directs log CPU circuitry 621 to aggregate similar aggregated logs based on the cosine similarity scores. The log filter application directs log CPU circuitry 621 to select rare logs based on their numbers of component logs. The log distribution application directs log CPU circuitry 621 to drive a display of the rare logs and metadata to receive log labels including block labels. The log distribution application directs log CPU circuitry 621 to transfer the labeled logs to the clients over the data communication application. The data communication application directs log CPU circuitry 621 to receive aggregated performance logs and performance anomaly detection indicators from the clients. The data communication application directs log CPU circuitry 621 to transfer the labeled logs to the clients. Advantageously, server circuitry 620 centralizes top-tier log aggregation and labeling to effectively control log processing and anomaly detection.

Figure 7:
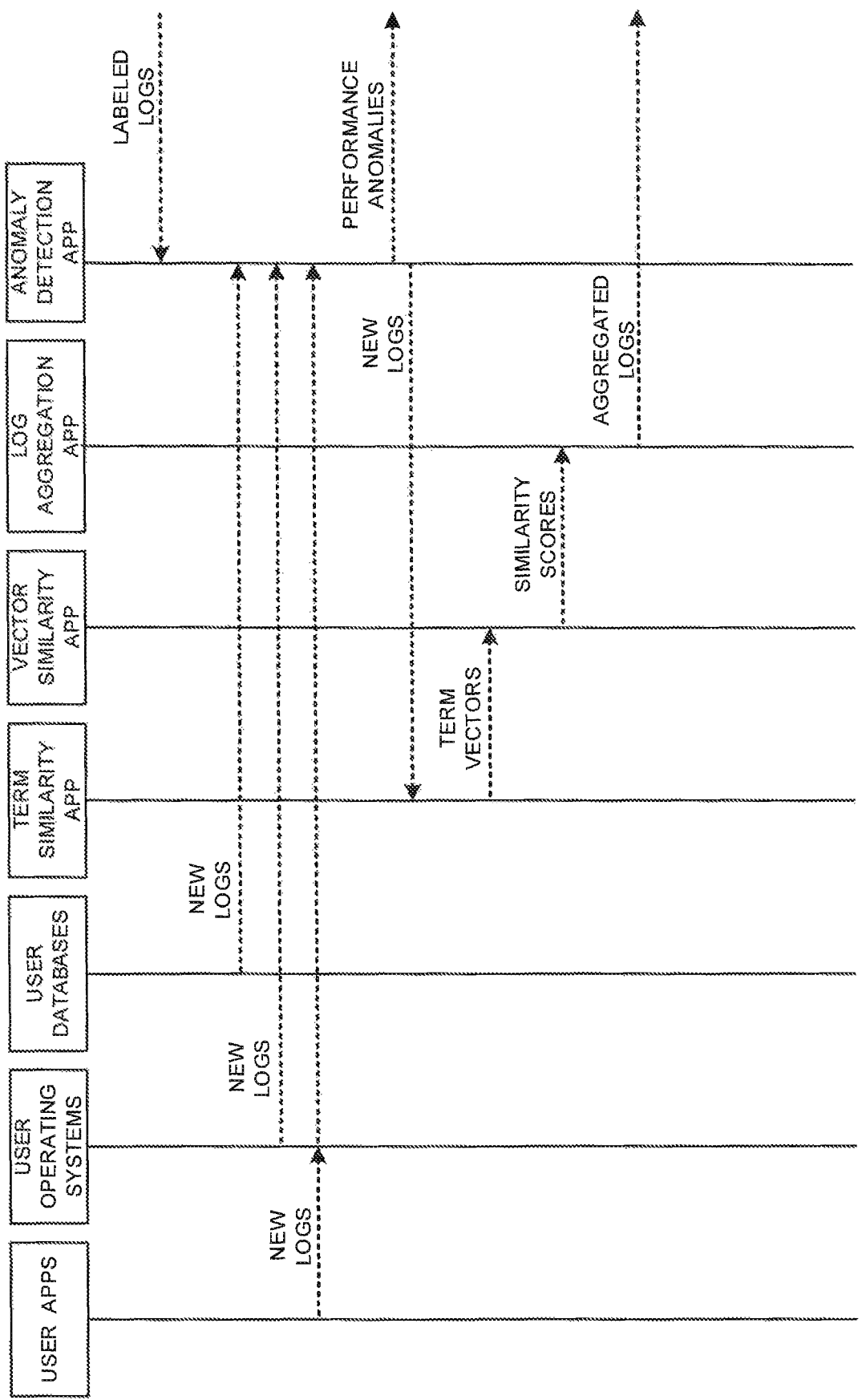
FIGS. 7-8 illustrate the operation of distributed computer circuitry to identify computer performance anomalies based on computer performance logs in an exemplary embodiment although the operation may vary in other embodiments.
Figure 8:
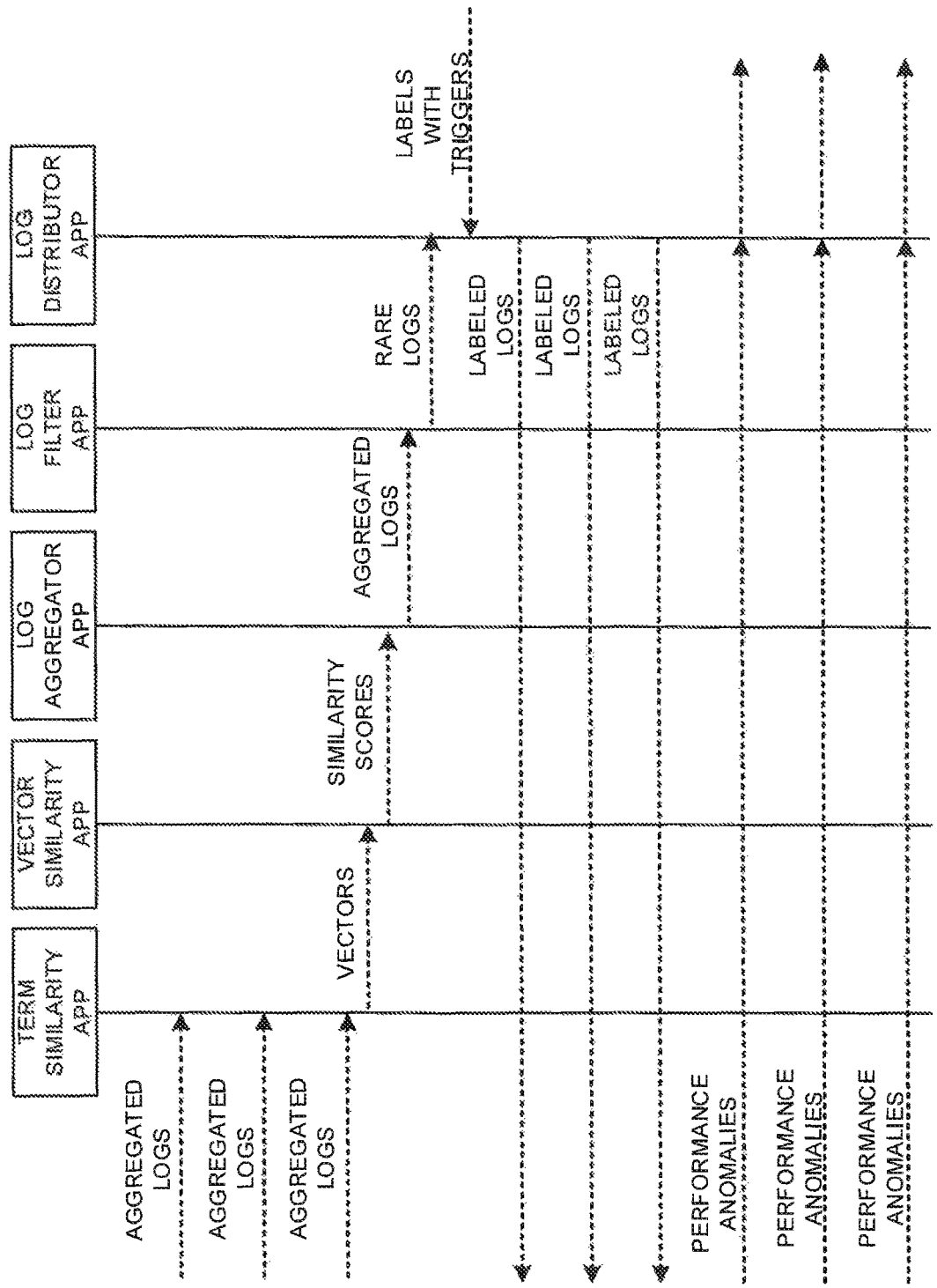

FIGS. 7-8 illustrate the operation of distributed computer circuitry to identify computer performance anomalies based on computer performance logs in an exemplary embodiment although the operation may vary in other embodiments. Referring to FIG. 7, the anomaly detection application in a client computer receives labeled logs from a server computer. The user applications, operating systems, and databases in the client computer generate new computer performance logs for processing by the anomaly detection application. In the client computer, the anomaly detection application compares the new performance logs to the labeled performance logs to detect corresponding computer performance anomalies based on term sequence matching. For example, a new performance log "2018:06:02:17:43:28 HOST 47 FAIL" matches the labeled performance log "[TOD] HOST [#] FAIL." In another example, a labeled log block may comprise: "HOST XY CPU 23 LATENCY ALARM" and "HOST AB FAIL" when they occur within an hour of one another. This labeled block would match the new computer performance logs "HOST XY CPU 23 LATENCY ALARM" and "HOST AB FAIL" when they are encountered in the same hour. The anomaly detection application detects matches new logs to labeled logs, and in response, performs triggers for the detected performance anomalies. The anomaly detection application also transfers the new logs to the term similarity application.

The term similarity application determines term characterization values for terms in the computer performance logs using term frequency—inverse document frequency, vector space models, latent semantic analytics, or some other text analytics application. The term similarity application generates vectors for the computer performance logs comprising the characterization values. The term similarity application transfers the vectors to the vector similarity application. The vector similarity application determines vector similarity for the vectors. The vector similarity scores indicate the sameness of the corresponding characterization values. The vector similarity application may use cosine similarity, Jaccard indexing, Sorensen quotients, or some other vector analytics application. The vector similarity application transfers the vector similarity scores to the log aggregation application. The log aggregation application aggregates similar logs into aggregated logs based on the vector similarity scores. The log aggregation application scrubs terms from the aggregated logs and adds placeholders. The log aggregation application transfers the aggregated performance logs to the server computer.

Referring to FIG. 8, the term similarity application receives aggregated logs from numerous client computers. The term similarity application determines term characterization values for terms in the aggregated client logs using a text processing application. The term similarity application generates vectors for the computer performance logs comprising the characterization values and transfers the vectors to the vector similarity application. The vector similarity application determines vector similarity scores for the vectors. The vector similarity application transfers the vector similarity scores to the log aggregator application. The log aggregator application aggregates similar logs into aggregated logs based on the vector similarity scores. The log aggregator application scrubs terms from the aggregated logs and adds placeholders. The log aggregator application transfers the aggregated performance logs to the log filter application.

The log filter application determines rare logs based on a comparison of an aggregated log's number of component logs to a numeric threshold. The log filter application transfers the rare logs to the log distributor application. The log distributor application presents the rare logs to a human expert for anomaly labeling. An exemplary label might be "DATA CENTER 34 LATENCY ALARM." An exemplary trigger might be to send a latency alarm for data center 34. The log distributor application may present blocks of performance logs to the human expert for block-level anomaly labeling. The log distributor application transfers the labeled logs to the anomaly detector applications in the client computers like client circuitry 510. The log distributor application also receives and forwards performance anomaly indications from the client computers.

Advantageously, the log analytic tool described above features client computers aggregate efficiently handle the massive amount of new and labeled computer performance log lines. Advantageously, the log analytic tool described above features a server computer that performs top-tier log aggregation and labels rare computer performance logs to control computer performance log processing and computer performance anomaly detection in the client computers.

The above description and associated drawings teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a computer to identify computer performance anomalies based on computer performance logs, the method comprising:

in the computer:
determining client term characterization values for multiple client computers;
determining client vector similarity scores for the multiple client computers;
aggregating client computer performance logs for the multiple client computers into client aggregated performance logs;
determining server term characterization values for at least one server computer;
determining server vector similarity scores for the at least one server computer;
aggregating the client aggregated performance logs into server aggregated performance logs;
determining term characterization values for terms in the computer performance logs and generating vectors indicating the term characterization values for the computer performance logs;
determining vector similarity scores for the vectors and aggregating the computer performance logs into aggregated performance logs based on the vector similarity scores and a similarity threshold;
selecting rare aggregated logs from the aggregated performance logs based on aggregation amounts for the aggregated performance logs and a rarity threshold; and
associating new computer performance logs with the rare aggregated logs to detect the computer performance anomalies.

2. The method of claim 1 wherein associating the new computer performance logs with the rare aggregated logs to detect the computer performance anomalies comprises associating a block of the new computer performance logs with a block of the rare aggregated logs to detect some of the computer performance anomalies.

3. The method of claim 1 further comprising, in the computer, removing a portion of the terms from the computer performance logs before determining the term characterization values.

4. The method of claim 1 wherein determining the term characterization values further comprises determining Term Frequency-Inverse Document Frequency (TF-IDF) values.

5. The method of claim 1 wherein determining the vector similarity scores comprises determining cosine similarity scores.

6. The method of claim 1 wherein aggregating the computer performance logs into the aggregated performance logs comprises replacing some of the terms in the aggregated performance logs with general placeholder descriptions.

7. A computer system to identify computer performance anomalies based on computer performance logs, the computer system comprising:

at least one client computer configured to:
determine client term characterization values, determine client vector similarity scores, and aggregate client computer performance logs;
determine term characterization values for terms in the computer performance logs;
generate vectors indicating the term characterization values for the computer performance logs, determine vector similarity scores for the vectors; and
aggregate the computer performance logs into aggregated performance logs based on the vector similarity scores and a similarity threshold;

at least one server computer configured to:
determine server term characterization values, determine server vector similarity scores, and aggregate the aggregated client computer performance logs into server aggregated performance logs; and select rare aggregated logs from the aggregated performance logs based on aggregation amounts for the aggregated performance logs and a rarity threshold; and the at least one client computer configured to associate new computer performance logs with the rare aggregated logs to detect the computer performance anomalies.

8. The computer system of claim 7 further comprising the at least one client computer configured to associate a block of the new computer performance logs with a block of the rare aggregated logs to detect some of the computer performance anomalies.

9. The computer system of claim 7 further comprising the at least one client computer configured to remove a portion of the terms from the computer performance logs before determining the term characterization values.

10. The computer system of claim 7 wherein the term characterization values comprise Term Frequency-Inverse Document Frequency (TF-IDF) values.

11. The computer system of claim 7 wherein the vector similarity scores comprise cosine similarity scores.

12. The computer system of claim 7 wherein the at least one client computer and the at least one server computer are configured to replace some of the terms in the aggregated performance logs with general placeholder descriptions.

13. A computer apparatus to identify computer performance anomalies based on computer performance logs, the computer apparatus comprising:

computer data storage configured to store log data computer processing instructions; and the log data computer processing instructions configured to direct the computer apparatus to:

determine client term characterization values for multiple client computers, determine client vector similarity scores for the multiple client computers, and aggregate client computer performance logs for the multiple client computers into client aggregated performance logs;

determine server term characterization values for at least one server computer, determine server vector similarity scores for the at least one server computer, and aggregate the client aggregated performance logs into server aggregated performance logs;

determine term characterization values for terms in the computer performance logs;

generate vectors indicating the term characterization values for the computer performance logs;

determine vector similarity scores for the vectors;

aggregate the computer performance logs into aggregated performance logs based on the vector similarity scores and a similarity threshold;

select rare aggregated logs from the aggregated performance logs based on aggregation amounts for the aggregated performance logs and a rarity threshold; and associate new computer performance logs with the rare aggregated logs to detect the computer performance anomalies.

14. The computer apparatus of claim 13 wherein the log data computer processing instructions are configured to direct the computer apparatus to associate a block of the new computer performance logs with a block of the rare aggregated logs to detect some of the computer performance anomalies.

15. The computer apparatus of claim 13 wherein the log data computer processing instructions are configured to direct the computer apparatus to remove a portion of the terms from the computer performance logs before determining the term characterization values.

16. The computer apparatus of claim 13 wherein the term characterization values comprise Term Frequency-Inverse Document Frequency (TF-IDF) values.

17. The computer apparatus of claim 13 wherein the vector similarity scores comprise cosine similarity scores.

18. The computer apparatus of claim 13 wherein the log data computer processing instructions are configured to direct the computer apparatus to replace some of the terms in the aggregated performance logs with general placeholder descriptions.

* * * * *